(12) United States Patent
Agarwal (10) Patent No.: US 10,739,461 B2
(45) Date of Patent: Aug. 11, 2020

(54) LIDAR POINT CLOUD COMPRESSION

(71) Applicant: Ford Global Technologies, LLC, Dearborn, MI (US)

(72) Inventor: Siddharth Agarwal, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 295 days.

(21) Appl. No.: 15/837,481

(22) Filed: Dec. 11, 2017

(65) Prior Publication Data

US 2019/0179022 A1  Jun. 13, 2019

(51) Int. Cl.
*G01S 17/89* (2020.01)
*G06T 9/00* (2006.01)
*G01S 17/931* (2020.01)
*G01S 7/48* (2006.01)

(52) U.S. Cl.
CPC ............ *G01S 17/89* (2013.01); *G01S 7/4808* (2013.01); *G01S 17/931* (2020.01); *G06T 9/00* (2013.01)

(58) Field of Classification Search
CPC ...... G01S 17/89; G01S 17/936; G01S 7/4808; G01S 17/931; G06T 9/00
See application file for complete search history.

(56) References Cited

U.S. PATENT DOCUMENTS

| | | | |
|---|---|---|---|
| 6,058,211 A | 5/2000 | Bormans et al. | |
| 7,804,980 B2 | 9/2010 | Sasaki | |
| 9,420,299 B2 | 8/2016 | Cordara et al. | |
| 9,710,492 B2 | 7/2017 | Grzeszczuk et al. | |
| 2016/0203385 A1 | 7/2016 | Margari et al. | |
| 2017/0237996 A1 | 8/2017 | Schneider | |

OTHER PUBLICATIONS

Xu et al., Road Curb Extraction From Mobile LiDAR Point Clouds, Feb. 2017, IEEE Transactions on GeoScience and Remote Sensing, vol. 55, No. 2, pp. 996-1009 (Year: 2017).*

* cited by examiner

*Primary Examiner* — Toan M Le
(74) *Attorney, Agent, or Firm* — Frank A. MacKenzie; Bejin Bieneman PLC (57) ABSTRACT

A system includes a processor and a memory. The memory stores instructions executable by the processor to define a plurality of volumes represented in an original set of point cloud data. The memory stores instructions executable by the processor to define a respective set of sub-volumes in each of the volumes, and to generate a reduced set of point cloud data including a number of points counted in selected sub-volumes.

20 Claims, 4 Drawing Sheets

LIDAR POINT CLOUD COMPRESSION

BACKGROUND

One or more computers in an autonomous vehicle (or self-driving car) can be programmed to navigate the vehicle based on vehicle sensor data and map data. The vehicle computers may rely on three-dimensional (3D) map data, including e.g., "point cloud" data generated from LIDAR sensor data, to navigate the vehicle to a destination. 3D map data typically include large quantities of data. These large quantities of sensor data need to be stored, processed, and/or transmitted via communication networks. Current systems and methods for addressing memory storage that affect data transmission bandwidth are lacking in efficiency and effectiveness. Therefore, it is a problem to be able to store and transmit 3D map data without exceeding current technical bandwidth and/or storage and processing constraints of existing technology.

DETAILED DESCRIPTION

Introduction

Disclosed herein is a system including a processor and a memory. The memory stores instructions executable by the processor to define a plurality of volumes represented in an original set of point cloud data, to define a respective set of sub-volumes in each of the volumes, and to generate a reduced set of point cloud data including a number of points counted in selected sub-volumes.

The sub-volumes may be equally dimensioned.

The system may further include a second processor and a second memory. The second memory may store instructions executable by the second processor to identify an object represented in the reduced set of point cloud data.

The second memory may further include instructions to identify the object based at least in part on the number of points counted in each of the sub-volumes.

Each volume in the original set of point cloud data may include at least one point of LIDAR reflectance data.

Each of the volumes may have a rectangular shape.

Each volume may include a vertical stack of some or all of the sub-volumes.

The instructions may further include instructions to select a sub-volume only if it includes one or more points.

Each of the plurality of volumes may have a bottom placed on a ground surface and a top spaced upwardly from a ground surface.

The instructions may further include instructions to define a height of each of the plurality of volumes based on a location of a highest point of the point cloud above a bottom of the volume.

The original set of point cloud data may include three-dimensional location coordinates of a plurality of points on surfaces within physical area covered by the set point cloud data.

Location coordinates of each point in the original set of point cloud may include a height from a ground surface and global positioning system coordinates including a lateral and a longitudinal coordinate.

Further disclosed herein is a method including defining a plurality of volumes represented in an original set of point cloud data, defining a respective set of sub-volumes in each of the volumes, and generating a reduced set of point cloud data including a number of points counted in selected sub-volumes.

The sub-volumes may be equally dimensioned.

The method may further include identifying, in a second processor, an object represented in the reduced set of point cloud data.

Each volume in the original set of point cloud data may include at least one point of LIDAR reflectance data.

The method may further include selecting a sub-volume only if it includes one or more points.

The method may further include defining a height of each of the plurality of volumes based on a location of a highest point of the point cloud above a bottom of the volume.

The original set of point cloud data may include three-dimensional location coordinates of a plurality of points on surfaces within physical area covered by the set point cloud data.

Location coordinates of each point in the original set of point cloud data may include a height from a ground surface and global positioning system coordinates including a lateral and a longitudinal coordinate.

Further disclosed is a computing device programmed to execute the any of the above method steps.

Yet further disclosed is a computer program product, comprising a computer readable medium storing instructions executable by a computer processor, to execute any of the above method steps.

System Elements

Figure 1:
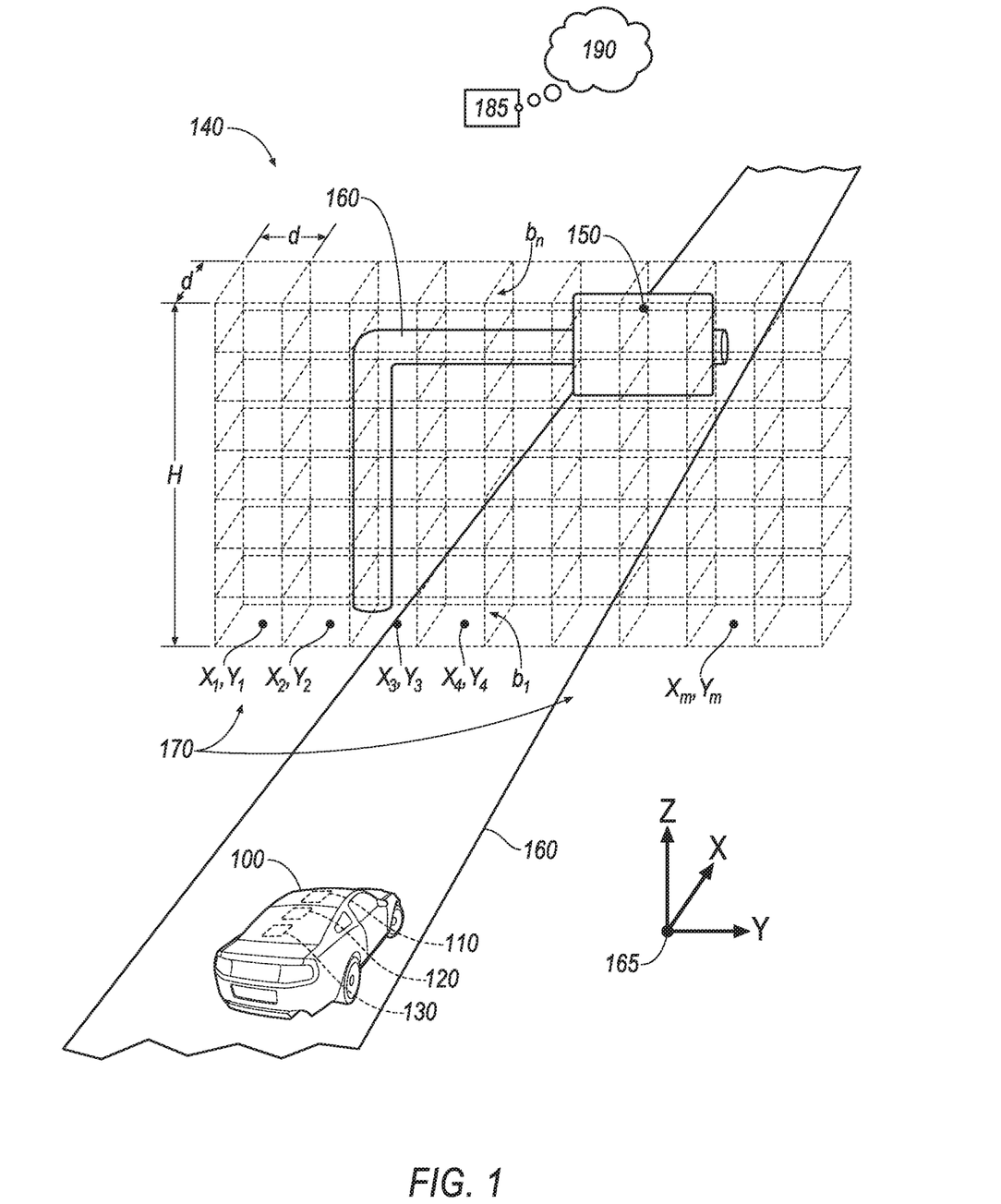
FIG. 1 is a block diagram of an exemplary vehicle and an exemplary point cloud.

FIG. 1 illustrates an example vehicle 100 including a computer 110, actuator(s) 120, sensor(s) 130, and other components discussed herein below. The vehicle 100 may be powered in variety of known ways, e.g., including with an electric motor and/or internal combustion engine.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering; in a non-autonomous mode, a human operator controls vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., the LIDAR sensor 130, actuators, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

The vehicle 100 actuators 120 may be implemented via circuits, chips, or other electronic components that can actuate various vehicle subsystems in accordance with appropriate control signals as is known. The actuators 120 may be used to control braking, acceleration, and steering of the first vehicle 100. As an example, the vehicle 100 computer 110 may output control instructions to control the actuators 120.

The vehicle 100 may include one or more LIDAR (Light Detection And Ranging) sensor(s) 130, providing data encompassing at least some of an exterior of the vehicle 100. The LIDAR sensor 130 may include a computer that is programmed to transmit LIDAR data. The LIDAR data may be received by the vehicle 100 computer 110 from LIDAR sensors 130 in a known manner, e.g., via a vehicle 100 network. The LIDAR data may include coordinates, e.g., in a 3-dimensional or cartesian coordinate system. LIDAR data may further include other data pertaining to other objects such as size, relative speed to the vehicle 100, etc.

Typically, a LIDAR sensor 130 can provide data for mapping physical features of sensed objects 160 with a very high resolution. A computer, e.g., the computer 110, a remote computer 185, etc., may be programmed to generate a three-dimensional (3D) map of an area 140. An area 140 may include a portion of the ground surface (i.e., earth surface), e.g., a neighborhood, a city, a rural area 140, etc.

A 3D map of an area 140, in the context of present disclosure, is a digital map including 3D coordinates of points 150 on surfaces of objects 160, e.g., a road surface, traffic signs, buildings, vegetation, etc., within the mapped area 140. The 3D location coordinates may be specified in a 3D Cartesian coordinate system with an origin point 165. In one example, location coordinates of a point 150 may be specified by X, Y, and Z. X and Y may be global positioning system (GPS) coordinates (i.e., lateral and longitudinal coordinates), whereas Z may specify a height (or elevation) of the point 150 from the ground surface. A 3D map may be generated based on data received from a LIDAR sensor 130 which sweeps the area 140 with light beams and receives reflections of the broadcasted light beams from outer surfaces of the objects 160. Thus, such a 3D map may include location coordinates of the points 150 on outer surfaces of objects 160 which cause a reflection of the emitted light beams. Typically, such 3D maps are referred to as a "point cloud." Thus, point cloud data (or a set of point cloud) include 3D location coordinates of points 150 on surfaces of objects 160 such as the road surface and/or outer surfaces of objects 160 within the area 140 that is mapped. In other words, the set of point cloud data includes 3D location coordinates of a plurality of points 150 within the physical area 140 that is covered by the set point cloud data.

The vehicle 100 computer 110 may be programmed to receive point cloud data and navigate the vehicle 100 based on the received location coordinates of points 150 in the point cloud. In one example, the vehicle 100 computer 110 may be programmed to identify objects 160 in an area 140 in which the vehicle 100 is operating, e.g., moving, based on received 3D map data of the respective area 140. In other words, the 3D map may be generated based on LIDAR sensor 130 data received from a mapping vehicle 100 and stored in a remote computer 185. The vehicle 100 may receive the 3D map of the area 140, e.g., from the remote computer 185, and may navigate the second vehicle 100 at least in part based on the received 3D map of the area 140. In one example, the computer 110 is programmed to transmit a request message specifying an area 140 to the remote computer 185, and to receive the reduced point cloud data covering the specified area 140. The computer 110 may be programed to specify the area 140 based on a current location of the vehicle 100. For example, the specified area 140 may include a circular area 140 with a predetermined radius, e.g., 500 meters and a center at the current location of the vehicle 100.

Depending on a resolution parameter, a 3D map may include coordinates of a various number of points 150 on a given object 160 outer surface. For example, a first example 3D map may include coordinates of 10 points 150 on a 10×10 centimeter (cm) surface of a traffic sign object 160, whereas a second example 3D map may include coordinates of 100 points 150 on the 10×10 cm outer surface. The resolution parameter, in the context of this disclosure, is a maximum number of point 150 location coordinates in a specified volume, e.g., a cube of 10×10×10 cm. The points 150 in a 3D map are outer surface points 150 because a laser sweep of objects 160 typically does not determine whether the objects are hollow or solid. In other words, the 3D map typically includes location coordinates of outer surface points 150 independent of whether an interior of the objects 160 is hollow or solid.

Although the 3D map generated based on high resolution LIDAR sensor 130 data is useful because the computer 110 can be programmed to navigate the vehicle 100 based at least in part on the 3D map, transmitting such 3D maps, e.g., via the wireless communication network 190, may consume large amount of bandwidth. "Bandwidth" in the present context refers to an amount of information that can be transmitted through a communication medium in a given duration of time. For example, bandwidth can be measured in bits per second, megabytes per second, etc. Further, storing the 3D map in a vehicle 100 computer 110 memory may consume a large amount of memory.

Disclosed herein is a solution to problems of excessive bandwidth and memory consumption of point cloud data that includes compressing 3D map data (specifically, compressing raw point cloud data received from one or more LIDAR sensors 130), advantageously reducing needed bandwidth and/or storage space, and at the same time reducing lost information due to this compression. For example, the remote computer 185 may be programmed to compress the 3D map data prior to transmitting the 3D map data to the vehicle 100, thus, advantageously, reducing a bandwidth used to transmit the 3D map data. Additionally or alternatively, the vehicle 100 computer 110 may be programmed to compress the received 3D map data prior to storing the 3D map data in a computer 110 memory, thus, advantageously, reducing amount of memory consumed to store the 3D map data.

To compress point cloud data, the computer 110 and/or the remote computer 185 can be programmed to define a plurality of volumes 170 represented in an original set of point cloud data (i.e., generated from raw data received from one or more LIDAR sensors 130), to define a respective set of sub-volumes in each of the volumes 170, and to generate a reduced set of point cloud data including a number of points 150 counted in selected sub-volumes. In the present context, the "original" set of point cloud and the "reduced" set of point cloud data refer to the point cloud data before and after compression, respectively.

Figure 2:
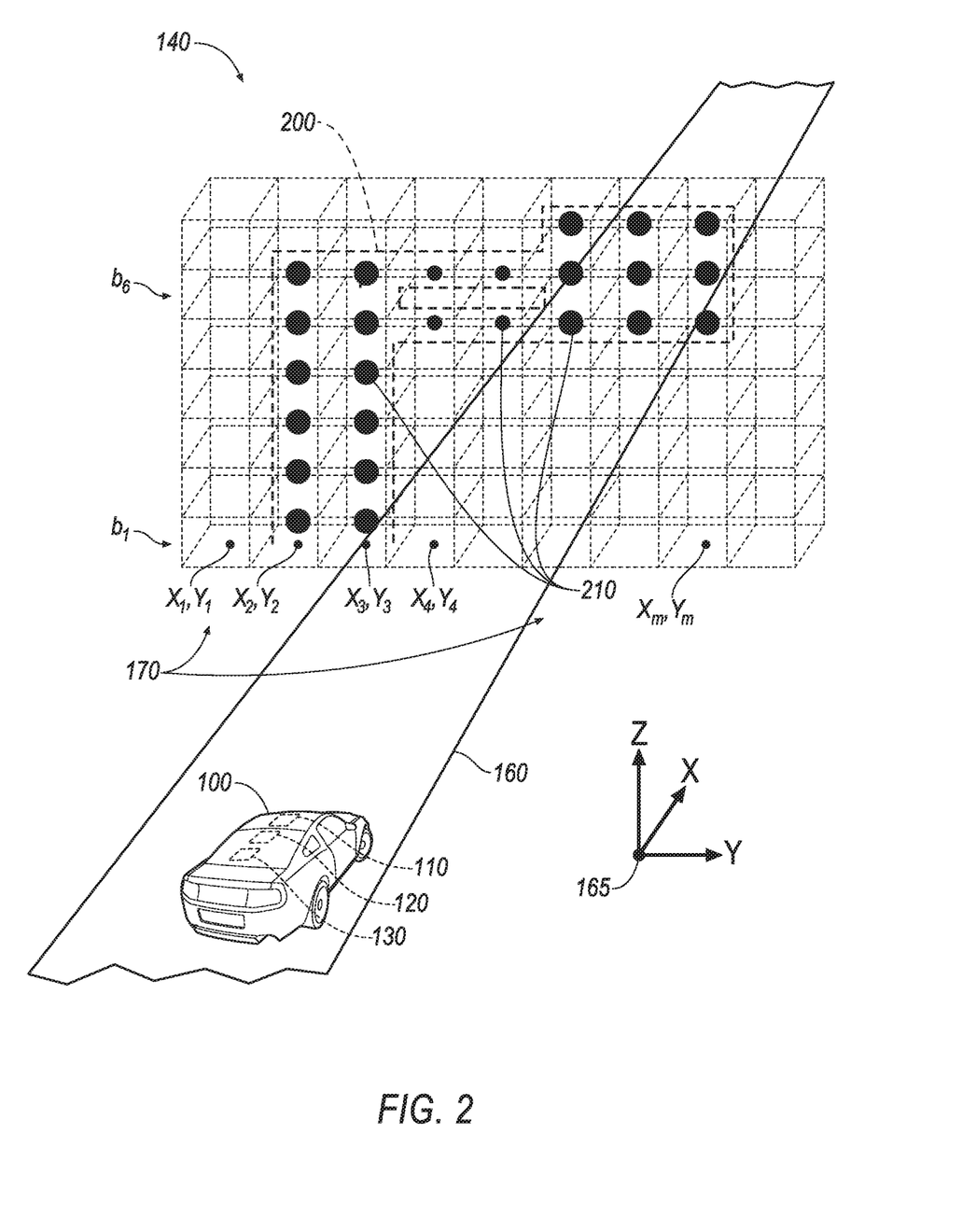
FIG. 2 is a block diagram of the vehicle and an example reduced point cloud data set of FIG. 1.

For example, as seen in FIGS. 1-2, to define the plurality of volumes 170, the 3D space covering the area 140 may be divided into a set of vertical volumes 170. In one example, each volume 170 may have a rectangular shape. Each volume 170 may have a height H. For example, the volumes 170 may have a height H of 50 meters. In one example, a bottom of a volume 170 (i.e., a bottom plane of the volume 170 located at a ground surface) may have a square shape with dimensions d, e.g., 10×10 cm. In one example, the 3D map may include volumes 170 only where there is at least one point 150 in the volume 170; volumes with zero data points are omitted. Each of the plurality of volumes 170 may have a bottom placed on a ground surface and a top spaced upwardly from the ground surface.

TABLE 1

| Volume Data | |
| --- | --- |
| Location coordinates | $X_1, Y_1$ |
| Longitudinal dimension | 10 cm |
| Lateral dimension | 10 cm |
| Height | 7 meters |
| Number of sub-volumes | 7 |

Each volume 170 may be divided into a number of sub-volumes. For example, as shown in FIGS. 1-2, the volumes 170 may be divided into seven sub-volumes $b_1$ to $b_7$. Each volume 170 may be identified by location coordinates of the volume 170 on the ground surface, the bottom, and its height H. For example, the location coordinates of the volume 170 may be identified by location coordinates of a center of the bottom of the volume 170. For example, $(X_1, Y_1), (X_2, Y_2), \ldots, (X_m, Y_m)$ specify location coordinate of a center of the bottom of m volumes 170 shown in FIG. 1. The location coordinates of the volumes 170 may be GPS location coordinates. For example, Table 1 shows the information associated with the volume 170 located at $X_1, Y_1$. The information shown in Table 1 and used below are selected for convenience of illustration and may not reflect actual dimensions of an object such as a traffic sign object 160.

The volumes 170 may be divided into a same number of sub-volumes, e.g., seven as shown in FIG. 1, or alternatively into a different number of sub-volumes. The sub-volumes may have same height as shown in FIG. 1, or alternatively have different heights. For example, the height H of each volume 170 may be determined based on a highest point of the point could above the bottom of the respective volume 170. In other words, a volume 170 height H may be determined such that each point 150 of the point cloud above the bottom of the volume 170 is placed inside the volume 170. In one example, the sub-volumes may be equally dimensioned.

TABLE 2

| Volumes 170 location | $b_1$ | $b_2$ | $b_3$ | $b_4$ | $b_5$ | $b_6$ | $b_7$ |
| --- | --- | --- | --- | --- | --- | --- | --- |
| $X_1, Y_1$ | 0 | 0 | 0 | 0 | 0 | 0 | 0 |
| $X_2, Y_2$ | 50 | 50 | 50 | 50 | 50 | 50 | 0 |
| $X_3, Y_3$ | 50 | 50 | 50 | 50 | 50 | 50 | 0 |
| $X_4, Y_4$ | 0 | 0 | 0 | 0 | 20 | 20 | 0 |
| $X_5, Y_5$ | 0 | 0 | 0 | 0 | 20 | 20 | 0 |
| ... | | | | | | | |
| $X_{m-1}, Y_{m-1}$ | 0 | 0 | 0 | 0 | 80 | 80 | 80 |
| $X_m, Y_m$ | 0 | 0 | 0 | 0 | 80 | 80 | 80 |

As discussed above, the computer 110 can be programmed to generate a reduced set of point cloud data including a number of points 150 counted in selected sub-volumes. As discussed below concerning FIG. 2, the computer 110 (or a second computer 110 in a second vehicle 100) may be programmed to identify reconstructed objects 200 based on the reduced set of point cloud data, and to navigate the vehicle 100 based at least in part on the reconstructed objects 200. The computer 110 may be programmed to generate a histogram for each of the volumes 170 based on number of the points 150 within each sub-volume of the volume 170.

A histogram, in the context of the present disclosure, and consistent with the plain and ordinary meaning of that term, is a distribution of numerical data in relation to sub-volumes of a volume 170. The histogram may include a number (or count) of points 150 in each of the sub-volumes. As discussed above, the area 140 may be divided into a set of volumes 170. The computer 110 may be programmed to generate a reduced set of point cloud data, the reduced set of point cloud data including a number of points 150 in each of the sub-volumes, and X, Y coordinates of the respective volume 170. For example, an example reduced set of point cloud for the area 140 has m volumes 170, and each volume 170 has seven sub-volumes, as shown in Table 2. In one example, the reduced set of point cloud may include the location coordinates X, Y of the volumes 170, the number of sub-volumes of each volume 170, and the histogram of the volumes 170, as shown in Table 2.

TABLE 3

| Volumes 170 location | $b_1$ | $b_2$ | $b_3$ | $b_4$ | $b_5$ | $b_6$ | b7 |
| --- | --- | --- | --- | --- | --- | --- | --- |
| $X_1, Y_1$ | 0 | 0 | 0 | 0 | 0 | 0 | 0 |
| $X_2, Y_2$ | 50 | 50 | 50 | 50 | 50 | 50 | 0 |
| $X_3, Y_3$ | 50 | 50 | 50 | 50 | 50 | 50 | 0 |
| $X_4, Y_4$ | 0 | 0 | 0 | 0 | 20 | 20 | 0 |
| $X_5, Y_5$ | 0 | 0 | 0 | 0 | 20 | 20 | 0 |
| ... | | | | | | | |
| $X_{m-1}, Y_{m-1}$ | 0 | 0 | 0 | 0 | 80 | 80 | 80 |
| $X_m, Y_m$ | 0 | 0 | 0 | 0 | 80 | 80 | 80 |

With reference to Table 3, various examples for further compressing the reduced set of point cloud are illustrated. In one example, each volume 170 in the original set of point cloud data may include at least one point 150 of LIDAR reflectance data, i.e., one point 150 on an object 160 surface that reflects a laser beam transmitted by a LIDAR sensor 130. In other words, the computer 110 may be programmed to omit volumes 170 with zero points 150 (i.e., lacking any points 150) in the respective volume 170. For example, as shown in FIG. 1, there is no point 150 in the volume 170 at $X_1, Y_1$. Thus, as shown in Table 3, the computer 110 may be programmed to omit data associated with the volume 170 at the location coordinates $X_1$, $Y_1$. The information marked in Table 3 with dashed lines represent information included in the reduced set of point could of Table 2 that may be omitted to further compress the reduced set of point cloud. Additionally or alternatively, the computer 110 may be programmed to select a sub-volume only if it includes one or more points 150. For example, the computer 110 may be programmed to select the sub-volumes $b_5$, $b_6$ of the volume 170 at the location coordinates $X_4$, $Y_4$ because there is no point 150 in other sub-volumes of the respective volume 170. Thus, each volume 170 may include a vertical stack of some or all of the sub-volumes, e.g., the volume 170 at location coordinates $X_5$, $Y_5$ may include sub-volume $b_5$, $b_6$.

Additionally or alternatively, the computer 110 may be programmed to define a height H of each of the plurality of volumes 170 based on a location of a highest point 150 of the point cloud above a bottom of the volume 170. For example, the computer 110 may define a lower height H for the volume 170 at the location coordinates $X_2$, $Y_2$ compared to the volume at the location $X_m$, $Y_m$, because of traffic sign object 160 points 150 in the sub-volume $b_7$.

FIG. 2 illustrates an object 200 that is a reconstruction of the object 160 of FIG. 1 based on the reduced set of point cloud as discussed with reference to Tables 2-3. The vehicle 100 computer 110 may be programmed to identify the object 200 represented in the reduced set of point cloud data. For example, the computer 110 receives the reduced set of point cloud from a remote computer 185. In one example, the remote computer 185 may be programmed to generate the point cloud based on LIDAR sensor 130 data received from a mapping vehicle 100, to compress the point cloud data, and to store the reduced point cloud in a remote computer 185 memory. The computer 110 may be programmed to receive the reduced set of point cloud via the wireless communication network 190 from the remote computer 185. Additionally or alternatively, the computer 110 may be programmed to receive the point cloud from the remote computer 185, to compress the point cloud, and to store the reduced set of point cloud in the computer 110 memory.

The computer 110 may be programmed to identify an object such as a traffic sign, guard rail, building, traffic cone, traffic light, bridge, etc., based at least in part on the reduced set of point cloud data. The computer 110 may be programmed to identify the object 200 based on the location coordinates of the volumes 170 and the histogram included in the reduced set of point cloud data. For example, the computer 110 may be programmed to define points or circles 210 based on the received histogram and location coordinates of the sub-volume, and to identify the object 200 based on the defined points 210, e.g., using image processing techniques. The computer 110 may be programmed to define the points 210 at a center of a sub-volume with a count greater than 0 (zero). The center of a sub-volume is a geometrical center, e.g., a geometrical center of a rectangular shaped sub-volume.

Additionally or alternatively, the computer 110 may be programmed to define circles 210 further based on a count included in the histogram, e.g., defining a circle with a dimeter that is proportional to the count associated with the sub-volume in the histogram. As shown in FIG. 2, the diameter of the circles 210 are proportional to the counts shown in Tables 2-3. The computer 110 may be programmed to identify the reconstructed object 200 based on a combination of location coordinates and the diameter of the circles 210. In one example, the computer 110 may be programmed to identify a density, size, type, etc., of a reconstructed object 200 based on the dimensions (diameter) of the circles 210.

For example, the computer 110 may be programmed to identify a substantially planar surface such as a surface of a traffic sign based on the location coordinates of the circles 210 and their diameter, as illustrated in Table 3 and FIG. 2.

In one example, the computer 110 may be programmed to determine that a continuous surface exists between the centers of two adjacent sub-volumes when the count of the adjacent sub-volumes each exist a count threshold, e.g., 70. Adjacent sub-volumes in the present context are either sub-volumes of same volume 170 on top of one another with one shared side, e.g., the sub-volumes $b_5$, $b_6$ of the volume 170 at the location coordinates $X_m$, $Y_m$, or sub-volumes of two adjacent volumes 170 with one shared side, e.g., the sub-volume $b_5$ of the volume 170 at the location coordinates $X_{m-1}$, $Y_{m-1}$ and the sub-volume $b_5$ of the volume 170 at the location coordinates $X_m$, $Y_m$.

A shape of a reconstructed object 200 may differ from a shape of the object 160 based on the original point cloud, e.g., the reconstructed object 200 compared to the original object 160, because the circles 210 are defined at a center of the sub-volumes. In other words, information about the location of each of the points 150 inside the sub-volume is only represented as a count of the points 150 at the center of the sub-volume. Therefore, the disclosed compression technique may be referred to as a lossy compression, i.e., some information may be lost through the compression of the original point cloud to generate the reduced set of point cloud. An amount of information lost may substantially depend on dimensions of sub-volumes. For example, with an increase of dimensions of the sub-volumes, the compression may cause more information to be lost.

Processing

Figure 3:
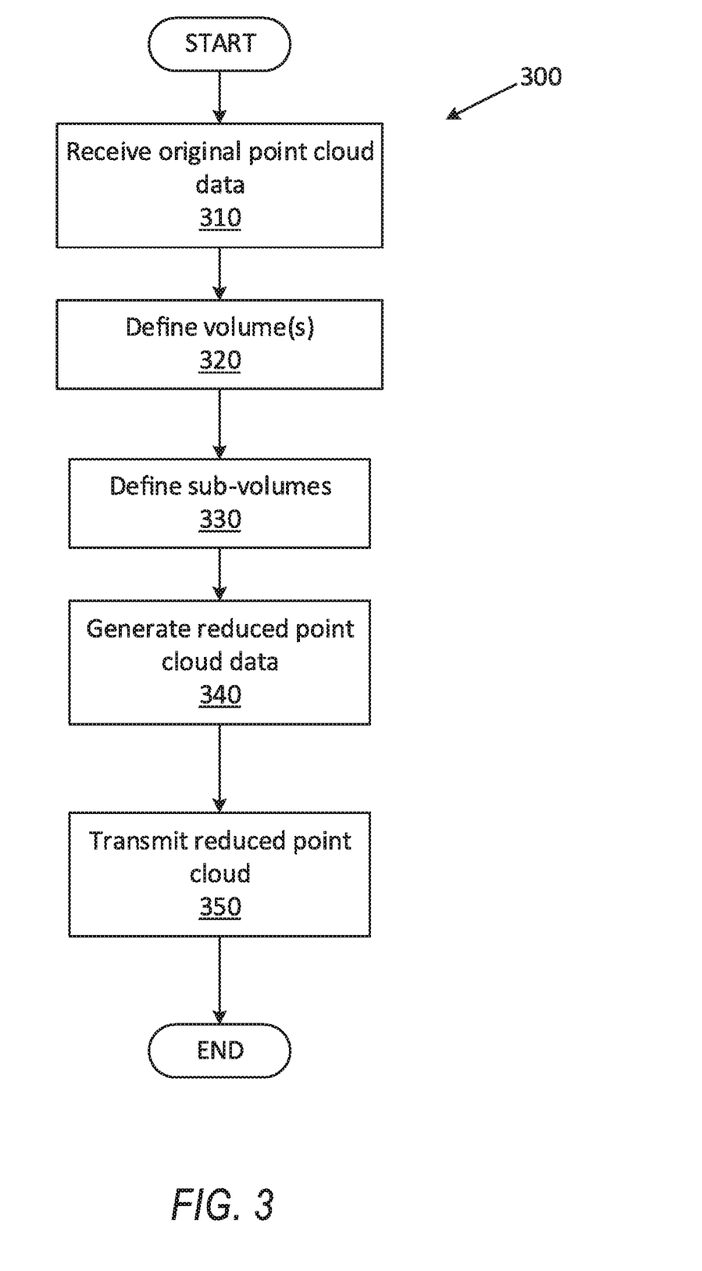
FIG. 3 is a flowchart of an exemplary process for generating reduced point cloud data.

FIG. 3 is a flowchart of an exemplary process 300 for compressing and transmitting data. For example, the remote computer 185 may be programmed to execute blocks of the process 300.

The process 300 begins in a block 310, in which the remote computer 185 receives the original point cloud data. In one example, the remote computer 185 may be programmed to receive the original point cloud data from a computer 185 memory.

Next, in a block 320, the remote computer 185 defines volumes 170. The remote computer 185 may be programmed to define volumes 170 based on location coordinates of the points 150 included in the original point cloud data. In one example, the remote computer 185 may be programmed to define the location coordinates and the height H of the volumes based on the 3D location coordinates of the points 150 included in the original point cloud data. In one example, the remote computer 185 may be programmed to define the volumes 170 which include at least one point 150.

Next, in a block 330, the remote computer 185 defines sub-volumes of the defined volumes 170, i.e., as described above regarding the block 320. The remote computer 185 may be programmed to divide the volumes 170 into a same number of sub-volumes, or alternatively into a different number of sub-volumes. The sub-volumes may have same height, or alternatively have different heights.

Next, in a block 340, the remote computer 185 generates reduced point cloud data. For example, as described above, the remote computer 185 may be programmed to generate reduced point cloud data including the location coordinates X, Y of the defined volumes 170, the number of defined sub-volumes of each volume 170, and the histogram of the volumes 170. Additionally, the remote computer 185 may be programmed to store the reduced point cloud data in a computer 185 memory.

Next, in a block 350, the remote computer 185 transmits the reduced point cloud data to, e.g., a vehicle 100 computer 110. The remote computer 185 may be programmed to transmit the reduced point cloud data via the wireless communication network 190. Additionally or alternatively, the remote computer 185 may be programmed to transmit the reduced point cloud data based on a request message received from the vehicle 100 computer 110. For example, the received request may specify an area 140, e.g., based on a current location of the vehicle 100. Thus, the remote computer 185 may be programmed to transmit reduced point cloud covering the requested area 140. Following the block 350, the process 300 ends, or alternatively returns to the block 310, although not shown in FIG. 3.

Figure 4:
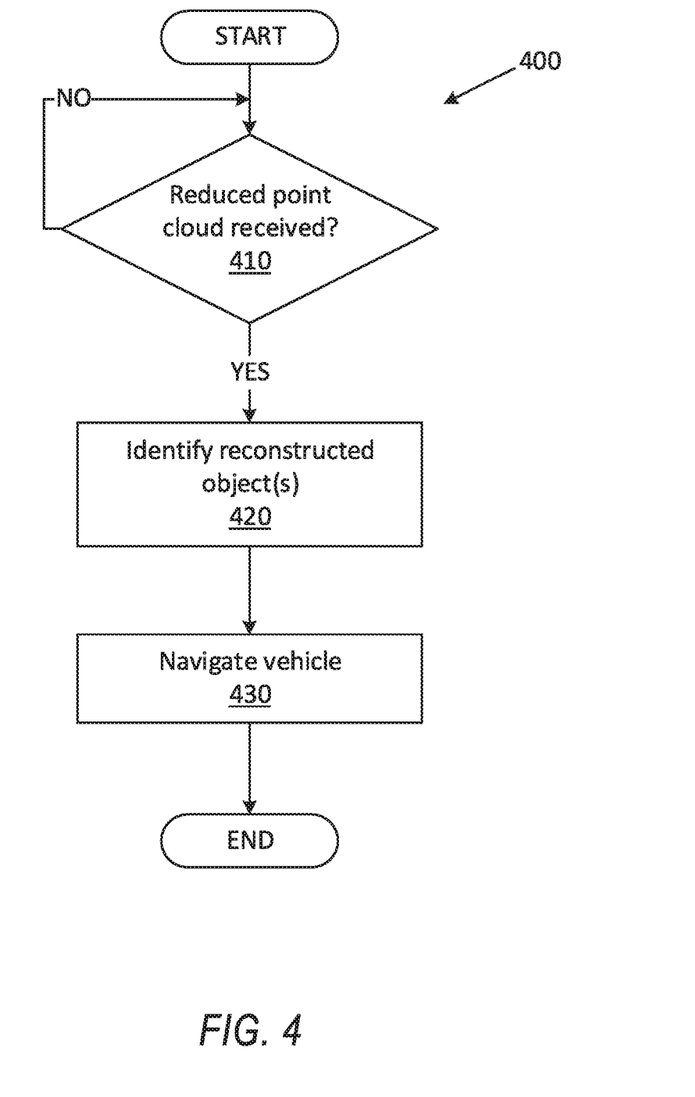
FIG. 4 is a flowchart of an exemplary process for operating the vehicle.

FIG. 4 is a flowchart of an exemplary process 400 for receiving reduced point cloud data and operating a vehicle. For example, the vehicle 100 computer 110 may be programmed to execute blocks of the process 400.

The process 400 begins in a decision block 410, in which the computer 110 determines whether a reduced point cloud is received from a remote computer 185. The computer 110 may be programmed to receive the reduced point cloud via the wireless communication network 190. In one example, the computer 110 may be programmed to transmit a request message specifying an area 140, and to receive from a computer 185, in response to the request message, the reduced point cloud data covering the specified area 140. If the computer 110 determines that the reduced point cloud data is received, then the process 400 proceeds to a block 420; otherwise the process 400 returns to the decision block 410.

In the block 420, the computer 110 identifies reconstructed objects 200 based on the reduced point cloud data. The computer 110 may be programmed to reconstruct objects 160 including traffic signs, traffic lights, buildings, road surface, road guardrail, vegetation, etc., based on the received reduced point cloud data.

Next, in a block 430, the computer 110 operates the vehicle 100 based at least in part on the reconstructed objects 200. For example, the computer 110 may be programmed to operate the vehicle 100 by actuating vehicle 100 propulsion, steering, and/or braking based at least in part on the reconstructed object 200. The computer 110 may be programmed to navigate the vehicle 100 while preventing a collision with the reconstructed objects 200. Additionally or alternatively, the computer 110 may be programmed to detect objects 160 based on a combination of reconstructed objects 200 and data received from vehicle 100 sensors 130 such as a camera sensor 130. Following the block 430, the process 400 ends, or alternatively, returns to the decision block 410.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   define a plurality of volumes represented in an original set of LIDAR sensor point cloud data;
   define a respective set of sub-volumes in each of the volumes;
   generate a reduced set of LIDAR sensor point cloud data including location coordinates of each of the plurality of volumes, and a histogram that counts a number of points on object surfaces in selected sub-volumes; and
   transmit the reduced set of LIDAR sensor point cloud data to a vehicle computer for vehicle navigation.

2. The system of claim 1, wherein the sub-volumes are equally dimensioned.

3. The system of claim 1, further comprising a second processor and a second memory, in a vehicle, the second memory storing instructions executable by the second processor to identify an object represented in the reduced set of LIDAR sensor point cloud data and to navigate the vehicle based on the identified object.

4. The system of claim 3, wherein the second memory further includes instructions to identify the object based at least in part on the number of points counted in each of the sub-volumes of the LIDAR sensor point cloud data.

5. The system of claim 1, wherein each volume in the original set of point cloud data includes at least one point of LIDAR reflectance data.

6. The system of claim 1, wherein each of the volumes has a rectangular shape.

7. The system of claim 1, wherein each volume includes a vertical stack of some or all of the sub-volumes.

8. The system of claim 1, wherein the instructions further include instructions to select a sub-volume in the LIDAR sensor point cloud data only if it includes one or more points.

9. The system of claim 1, wherein each of the plurality of volumes has a bottom placed on a ground surface and a top spaced upwardly from a ground surface.

10. The system of claim 1, wherein the instructions further include instructions to define a height of each of the plurality of volumes based on a location of a highest point of the point cloud above a bottom of the volume.

11. The system of claim 1, wherein the original set of point cloud data includes three-dimensional location coordinates of a plurality of points on surfaces within physical area covered by the set point cloud data.

12. The system of claim 1, wherein location coordinates of each point in the original set of point cloud include a height from a ground surface and global positioning system coordinates including a lateral and a longitudinal coordinate.

13. The system of claim 1, wherein the instructions further include instructions to select a sub-volume of a volume upon determining that the respective sub-volume includes at least one point of LIDAR reflectance data, and generate the reduced set of LIDAR sensor point cloud data including location coordinates of the plurality of volumes, a number of sub-volumes in each volume, and a histogram that counts a number of points on object surfaces in the selected sub-volumes.

14. A method, comprising:
defining a plurality of volumes represented in an original set of LIDAR sensor point cloud data;
defining a respective set of sub-volumes in each of the volumes;
generating a reduced set of LIDAR sensor point cloud data including location coordinates of each of the plurality of volumes, and a histogram that counts a number of points on object surfaces counted in selected sub-volumes; and
transmitting the reduced set of LIDAR sensor point cloud data to a vehicle computer for vehicle navigation.

15. The method of claim 14, further comprising identifying, in a second processor, in a vehicle, an object represented in the reduced set of LIDAR sensor point cloud data.

16. The method of claim 14, wherein each volume in the reduced set of LIDAR sensor point cloud data includes at least one point of LIDAR reflectance data.

17. The method of claim 14, further comprising selecting a sub-volume in the LIDAR sensor point cloud data only if it includes one or more points.

18. The method of claim 14, further comprising defining a height of each of the plurality of volumes based on a location of a highest point of the point cloud above a bottom of the volume.

19. The method of claim 14, wherein the original set of point cloud data includes three-dimensional location coordinates of a plurality of points on surfaces within physical area covered by the set of LIDAR sensor point cloud data.

20. The method of claim 14, wherein location coordinates of each point in the original set of LIDAR sensor point cloud data include a height from a ground surface and global positioning system coordinates including a lateral and a longitudinal coordinate.

* * * * *